(12) United States Patent
Jhong

(10) Patent No.: US 10,254,810 B2
(45) Date of Patent: *Apr. 9, 2019

(54) ELECTRONIC DEVICE

(71) Applicant: HON HAI PRECISION INDUSTRY CO., LTD., New Taipei (TW)

(72) Inventor: Jia-Ciao Jhong, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,773

(22) Filed: Sep. 18, 2017

(65) Prior Publication Data

US 2018/0067529 A1   Mar. 8, 2018

Related U.S. Application Data

(63) Continuation of application No. 14/340,571, filed on Jul. 25, 2014, now Pat. No. 9,804,651.

(30) Foreign Application Priority Data

Jul. 29, 2013   (TW) .............................. 102127064 A

(51) Int. Cl.
   *G06F 1/26*       (2006.01)
   *G06F 13/40*      (2006.01)
(52) U.S. Cl.
   CPC ................ *G06F 1/266* (2013.01); *G06F 1/26* (2013.01); *G06F 13/4022* (2013.01)

(58) Field of Classification Search
   CPC . G06F 1/266; G06F 13/385; H02J 2007/0062
   See application file for complete search history.

(56) References Cited

U.S. PATENT DOCUMENTS

| | | | | |
|---|---|---|---|---|
| 8,028,178 | B2* | 9/2011 | Gk ........................ | G06F 1/266 713/310 |
| 8,293,925 | B2* | 10/2012 | Charvat ............. | C07D 207/416 548/537 |
| 8,626,932 | B2* | 1/2014 | Lydon ................... | G06F 13/387 709/228 |
| 8,788,852 | B2* | 7/2014 | Chun ...................... | G06F 1/266 320/126 |
| 8,898,363 | B2* | 11/2014 | Saarinen ............... | G06F 13/385 710/305 |
| 8,990,461 | B2* | 3/2015 | Ballot ................... | G06F 13/426 710/72 |
| 9,122,813 | B2 | 9/2015 | Oljaca et al. | |
| 9,244,876 | B2* | 1/2016 | Pedro .................. | G06F 13/4077 |
| 9,327,321 | B2* | 5/2016 | Chen .................... | H02J 7/0068 |

(Continued)

*Primary Examiner* — Brian T Misiura
(74) *Attorney, Agent, or Firm* — ScienBiziP, P.C.

(57) ABSTRACT

An electronic device includes a battery, a detecting unit, a comparing unit, a control unit and a charging circuit. The detecting unit is electronically connected to a universal serial bus (USB) interface to detect and determine whether or not the connecting device is a power adapter. The comparing unit outputs a level signal depending upon the comparing unit comparing a input signal received by the USB interface with a voltage threshold. The control unit controls the battery either to be charged by the connecting device through the charging circuit or the battery to supply power to the connecting device through the USB interface according to the level signal.

12 Claims, 5 Drawing Sheets

(56) References Cited

U.S. PATENT DOCUMENTS

| | | | | |
|---|---|---|---|---|
| 9,418,032 B2* | 8/2016 | Terlizzi | ................ | G06F 13/385 |
| 2004/0048143 A1 | 3/2004 | Stumpf | | |
| 2007/0072474 A1 | 3/2007 | Beasley et al. | | |
| 2008/0222438 A1* | 9/2008 | Lin | ................ | G06F 13/385 |
| | | | | 713/340 |
| 2008/0265838 A1* | 10/2008 | Garg | ................ | G06F 1/266 |
| | | | | 320/115 |
| 2009/0174366 A1* | 7/2009 | Ahmad | ................ | H02J 7/0055 |
| | | | | 320/114 |

* cited by examiner

ELECTRONIC DEVICE

CROSS-REFERENCE TO RELATED APPLICATIONS

The application is a continuation of U.S. application Ser. No. 14/340,571, filed Jul. 25, 2014, which claims priority to Taiwanese Patent Application No. 102127064 filed on Jul. 29, 2013, the contents of which are incorporated by reference herein.

FIELD

The disclosure relates to electronic devices, and particularly to a power adapter supplying power to an electronic device.

BACKGROUND

Usually, a power adapter supplies power to laptops via universal serial bus (USB) interfaces. Laptops can comprise a variety of interfaces.

BRIEF DESCRIPTION OF THE DRAWINGS

Implementations of the present technology will now be described, by way of example only, with reference to the attached figures, wherein.

DETAILED DESCRIPTION

Figure 1:
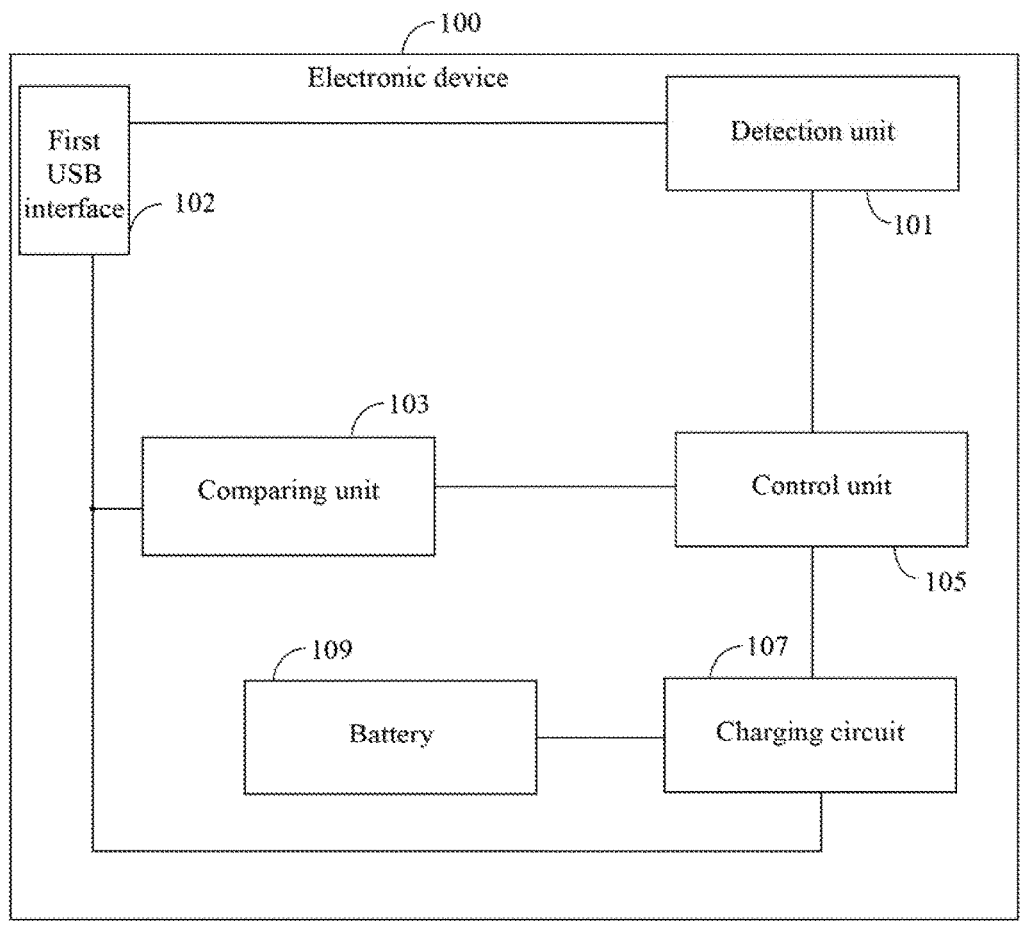
FIG. 1 illustrates a function module of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The following disclosure is described in relation to an electronic device.

FIG. 1 illustrates a function module of one embodiment of an electronic device 100. In one embodiment, the electronic device 100 is connected to a connecting device (not shown), the connecting device can be a power adapter or a device including a general universal serial bus (USB) interface. The electronic device comprises a first universal serial bus (USB) interface 102, a detecting unit 101, a comparing unit 103, a control unit 105, a charging circuit 107, and a battery 109. The first USB interface 102 is connected to the connecting device to receive an input signal from the connecting device.

The battery 109 can store energy and supply power signals to the electronic device 100. The charging circuit 107 is electronically connected to the battery 109 and the first USB interface 102.

The detecting unit 101 is electronically connected to the first USB interface 102, to detect and determine whether or not the connecting device is the power adapter. In one embodiment, the connecting device can be a peripheral device which includes a general USB interface.

The comparing unit 103 is electronically connected to the USB interface, and the comparing unit 103 compares voltage of the input signal received by the first USB interface 102 with a voltage threshold to output a level signal. In one embodiment, the comparing unit 103 stores the voltage threshold.

The control unit 105 is electronically connected to the detecting unit 101, the comparing unit 103, and the charging circuit 107. The control unit 105 controls the battery 109 to be charged by the connecting device through the charging circuit 107 or to supply power to the connecting device through the USB interface 102 according to the level signal output by the comparing unit 103. In one embodiment, the control unit 105 is an embedded controller. In response to the detecting unit 101 determining that the connecting device is the power adapter, the electronic device 100 is in the charging mode, the control unit 105 controls the first USB interface 102 to charge the battery 109 through the charging circuit 107. In response to the detecting unit 101 determining that the connecting device is a peripheral device including a general USB interface, the electronic device 100 is in general USB interface mode, and the control unit 105 controls the battery 109 to supply power to the connecting device through the USB interface 102. In response to the electronic device 100 being in general USB interface mode, the control unit 105 controls the battery 109 to supply power signals to the connecting device.

In at least one embodiment, in response to the voltage of the input signal of the first USB interface 102 being greater than the voltage threshold, the comparing unit 103 outputs a first level signal to the control unit 105, the electronic device 100 is in general USB interface mode, and the control unit 105 controls the battery 109 to supply power signals to the connecting device. In response to the voltage of the input signal of the first USB interface 102 being less than the voltage threshold, the comparing unit 103 outputs a second level signal to the control unit 105, the electronic device 100 is in the charging mode, and the control unit 105 that the first USB interface 102 to charge the battery 109 through the charging circuit 107.

Figure 2:
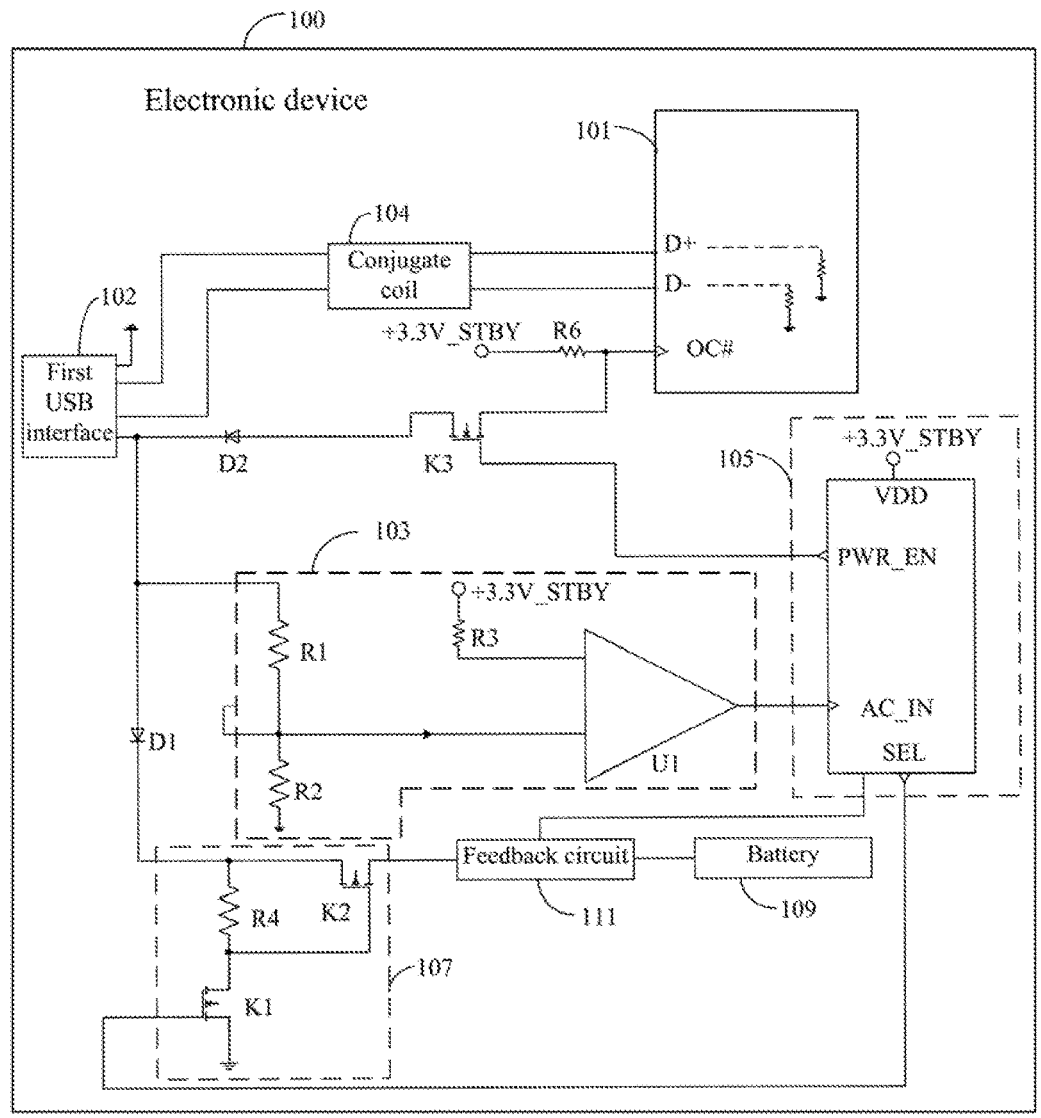
FIG. 2 is a circuit diagram of one embodiment of the electronic device of FIG. 1.

FIG. 2 is a circuit diagram of one embodiment of the electronic device 100 of FIG. 1. In at least one embodiment, the electronic device 100 comprises an USB interface 102, a detecting unit 101, a comparing unit 103, a conjugate coil 104, a control unit 105, a charging circuit 107, and a battery 109.

In one embodiment, the detecting unit 101 is a southbridge chip, the detecting unit 101 comprises a first port D+, a second port D−, and a third port OC#. The first port D+ and the second port D− detect signals from the connecting device through the conjugate coil 104. The third port OC# receives an auxiliary signal (+3.3V_STBY) through a sixth diode R6. The detecting unit 101 determines whether or not the connecting device is a power adapter according to the signals detected by the first port D+ and the second port D−. When both the signals detected by the first port D+ and the second port D− are logic 1 signals, the detecting unit 101 determines that the connecting device is the power adapter. When any one of the signals detected by the first port D+ and the second port D− is a logic 0 signal, the detecting unit 101 determines that the connecting device is a peripheral device including the general USB interface. In one embodiment, a peripheral device including the general USB interface cannot charge the battery 109 of the electronic device 100.

The comparing unit 103 comprises a comparator U1, a first resistor R1, a second resistor R2, and a third resistor R3. One end of the first resistor R1 is electronically connected to the USB interface, the other end of the first resistor R1 is electronically connected to one end of the second resistor R2, the other end of the second resistor R2 is grounded. The comparator U1 comprises a first input, a second input, and an output. The first input of the comparator U1 receives an auxiliary signal (+3.3V_STBY) through the third resistor R3, the second input of the comparator U1 is electronically connected at a node between the first resistor R1 and the second resistor R2, the output of the comparator U1 is electronically connected to the control unit 105. In one embodiment, the voltage threshold of the comparing unit 103 is voltage of the auxiliary signal.

In at least one embodiment, when the detecting unit 101 detects that the connecting device is the power adapter, the comparing unit 103 outputs a level signal depending upon comparing the voltage of the auxiliary signal with voltage of the second resistor R2. The control unit 105 controls the electronic device 100 to be the charging mode according to the level signal output by the comparing unit 103. When the voltage of the auxiliary signal is greater than the voltage of the second resistor R2, the electronic device 100 is in the general USB interface mode, the comparator U1 outputs a logic 0 signal to the control unit 105. The control unit 105 outputs a logic 0 signal to the charging circuit 107, the charging circuit 107 turns off, and the battery 109 supplies power signals to the connecting device. When the voltage of the auxiliary signal is less than the voltage of the second resistor R2, the electronic device 100 is in the charging mode, and the comparator U1 outputs a logic 1 signal to the control unit 105. The control unit 105 outputs a logic 1 signal to the charging circuit 107, the charging circuit 107 turns on, and the first USB interface 102 charges the battery 109 through the charging circuit 107.

The charging circuit 107 can comprise a first switch K1, a second switch K2, and a fourth resistor R4. The first switch K1 comprises a first port, a second port, and a control port. The first port is electronically connected to the first USB interface 102, the second port is grounded, and the control port is electronically connected to the control unit 105. The second switch K2 comprises a first port, a second port, and a control port. The first port is electronically connected to the first USB interface 102, the second port is electronically connected to the battery 109, and the control port is electronically connected to the second port of the first switch K1. The fourth resistor R4 is electronically connected between the first USB interface 102 and the first port of the first switch K1. In one embodiment, when the electronic device 100 is in the charging mode, the control unit 105 outputs a logic 1 signal to the first switch K1, and the control port of the second switch K2 receives a logic 1 signal. The first port of the third switch connects to the second port and the connecting device charges the battery 109 through the first USB interface 102.

In at least one embodiment, the electronic device 100 can comprise a first diode D1. The first diode D1 comprises an anode and a cathode. The anode of the first diode D1 is electronically connected to a node between the first USB interface 102 and the comparing unit 103. The cathode of the first diode is electronically connected to the charging circuit 107. In response to the electronic device being in the general USB interface mode, the first diode D1 prevents current of the battery 109 from flowing back.

The feedback circuit 111 can be electronically connected to the control unit 105, the charging circuit 107, and the battery 109, to output a feedback signal to the control unit 105 according to a charging voltage of the battery 109.

In at least one embodiment, the electronic device 100 comprises a third switch K3 and a second diode D2. The third switch K3 comprises a first port, a second port, and a control port. The first port is electronically connected to the first USB interface 102, the second port is electronically connected to the detecting unit 101, and the control port is electronically connected to the control unit 105. The second diode D2 is electronically connected between the first USB interface 102 and the third switch K3. An anode of the second diode D2 is electronically connected to the first port of the third switch K3. When the electronic device 100 is in the general USB interface mode, the control unit controls that the first port of the third switch K3 connects to the second port.

In one embodiment, the first switch K1, the second switch K2, and the third switch K3 are transistors. In another embodiment, the first switch K1, the second switch K2, and the third switch K3 are MOSFETs. The type of the first switch K1, the second switch K2, and the third switch K3 can be adjusted according to different conduction demand.

Figure 3:
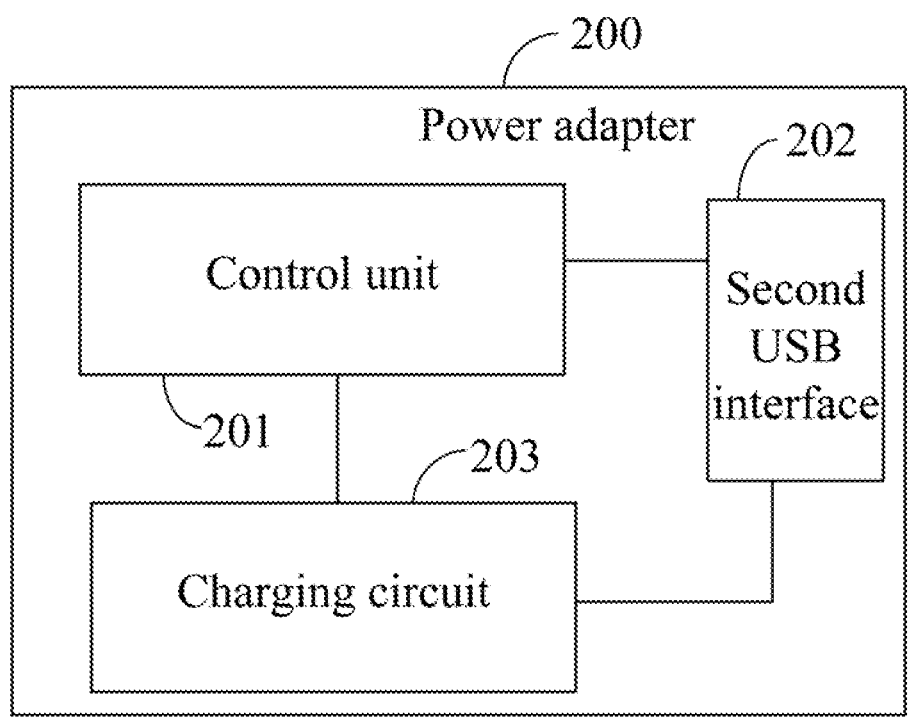
FIG. 3 illustrates a function module of one embodiment of a power adapter.

FIG. 3 illustrates a function module of one embodiment of a power adapter 200. In one embodiment, the power adapter 200 is charging an electronic device (not shown) according to an external power signal. The power adapter 200 comprises a second USB interface 202, a control unit 201, and a charging circuit 203. The second USB interface 202 connects to the electronic device to receive signals from the electronic device. The control unit 201 is electronically connected to the second USB interface 202, to output a control signal to the charging circuit 203 according to level of signals received by the second USB interface 202. The charging circuit 203 is electronically connected to the control unit 201 and receives the external power signal to determine whether or not to output the external power signal to the electronic device according to the control signal output by the control unit 201. In one embodiment, the external power signal is a 220 volt signal.

Figure 4:
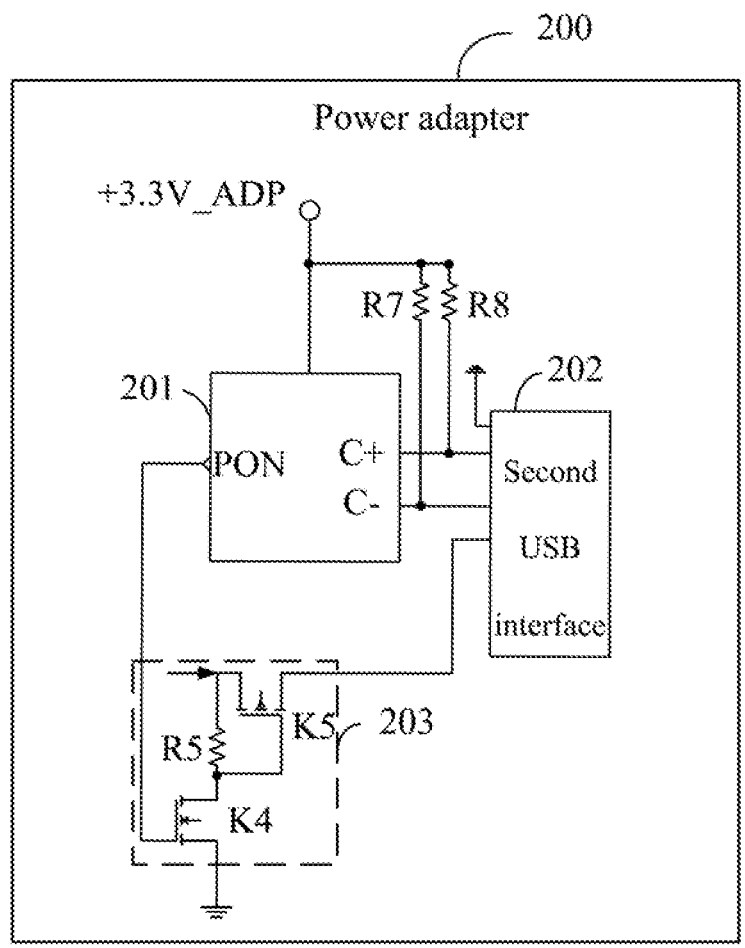
FIG. 4 is a circuit diagram of one embodiment of the power adapter of FIG. 3.

FIG. 4 is a circuit diagram of one embodiment of the power adapter 200 of FIG. 3. In one embodiment, the control unit 201 comprises a first port C+, a second port C−, and a control port PON. The first port C+ and the second port C− of the control unit 201 are electronically connected to the second USB interface 202, to receive the level signals from the electronic device.

In at least one embodiment, the power adapter 200 comprises a seventh resistor R7, an eighth resistor R8, and an auxiliary power port +3.3 v_ADP. One end of the seventh resistor R7 and one end of the eighth resistor R8 is electronically connected to the auxiliary power port +3.3 v_ADP. The other end of the seventh resistor R7 is electronically connected to the second port C− of the control unit 201. The other end of the eighth resistor R8 is electronically connected to the first port C+ of the control unit 201.

The charging circuit 203 comprises a fourth switch K4, a fifth switch K5, and a fifth resistor R5. The fourth switch K4 comprises a first port, a second port, and a control port. The second port is grounded and the control port is electronically connected to the control port PON of the control unit 201. The fifth switch K5 comprises a first port, a second port, and a control port. The first port of the fifth switch K5 receives the external power signal. The second port of the fifth switch K5 is electronically connected to the second USB interface 202. The control port of the fifth switch K5 is electronically connected to the first port of the fourth switch K4. The fifth resistor R5 comprises a first end and a second end. The first end of the fifth resistor R5 is electronically connected to a node between the first port of the fourth switch K4 and the control port of the fifth switch K5. The second end of the fifth resistor R5 is electronically connected to the first port of the fifth switch K5.

In at least one embodiment, when the first port C+ and the second port C− of the control unit 201 receive logic 1 signals. The control port PON of the control unit 201 outputs a logic 1 signal to the charging circuit 203, controlling the charging circuit 203 to output the external power signal to the electronic device.

Figure 5:
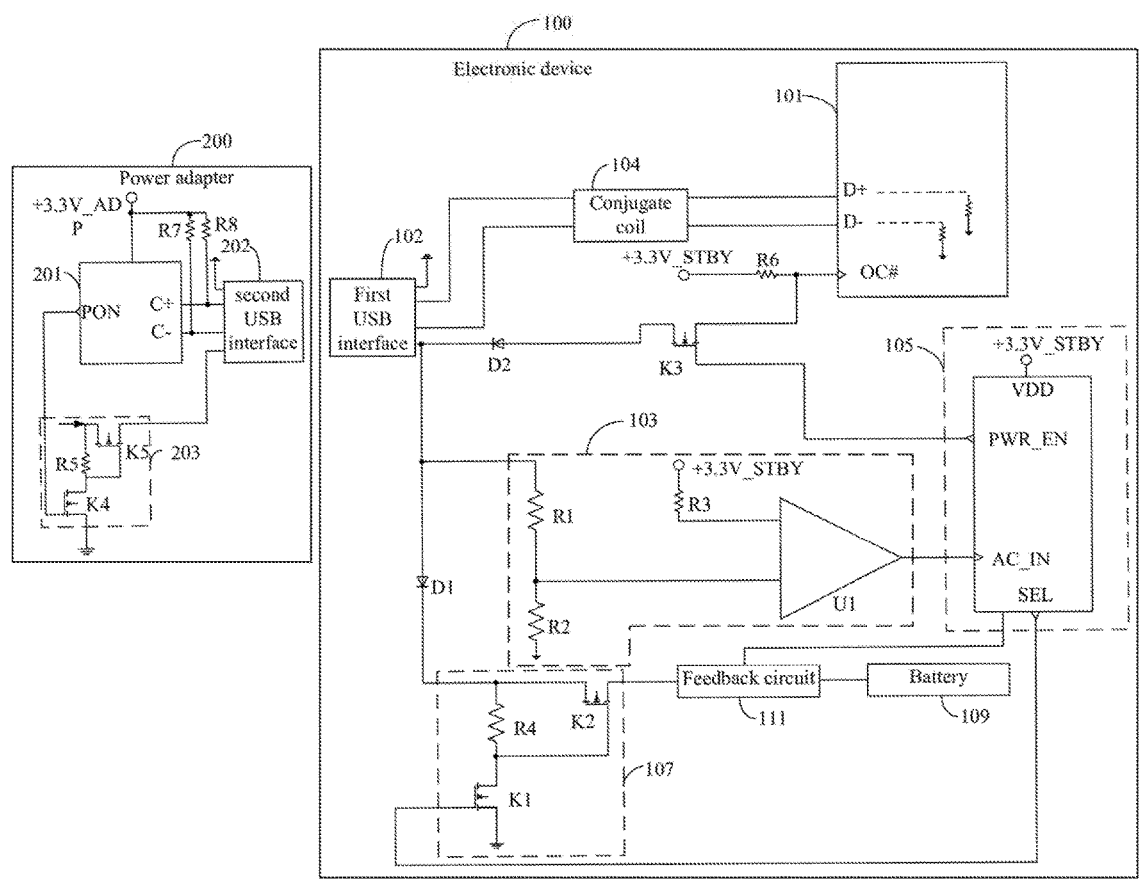
FIG. 5 is a circuit diagram of one embodiment of a combination of the electronic device of FIG. 2 and the power adapter of FIG. 4.

FIG. 5 is a circuit diagram of one embodiment of a combination of the electronic device 100 of FIG. 2 and the power adapter 200 of FIG. 4. In one embodiment, the power adapter 200 charges the electronic device 100 through the first USB interface 102 and the second USB interface 202. The first USB interface 102 of the electronic device 100 charges from the power adapter 200.

In one embodiment, the electronic device 100 is a laptop or an electronic book or a device including an USB interface.

The electronic device 100 comprises the first USB interface 102, the detecting unit 101, the comparing unit 103, the conjugate coil 104, the control unit 105, the charging circuit 107, and the battery 109. The first USB interface 102 of the electronic device 100 charges from the power adapter 200.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
a first universal serial bus (USB) interface electrically connected to a connecting device, configured to receive an input signal from the connecting device, wherein the connecting device is a power adapter or a peripheral device including a general USB interface;
a battery;
a charging circuit electrically connected to the battery and the first USB interface;
a detecting unit electrically connected to the first USB interface, configured to detect and determine whether the connecting device is the power adapter;
a comparing unit electrically connected to the first USB interface, configured to output a level signal depending upon comparing the input signal received by the first USB interface with a voltage threshold; and
a control unit electrically connected to the detecting unit, the comparing unit, and the charging circuit, and configured to control the battery to be charged by the connecting device through the charging circuit or to supply power to the connecting device through the first USB interface, depending on the signal level output by the comparing unit;
a first switch with a first port electronically connected to the first USB interface, a second port grounded, and a control port electronically connected to the control unit;
a second switch with a first port electronically connected to the first USB interface, a second port electronically connected to the battery, and a control port electronically connected to the second port of the first switch.

2. The electronic device of claim 1, wherein in response to the voltage of the input signal received by the first USB interface being greater than the voltage threshold, the detecting unit determines that the connecting device is the power adapter.

3. The electronic device of claim 2, wherein in response to determining that the connecting device is the power adapter, the detecting unit sends a signal to the connecting device to control the connecting device to supply power to the electronic device.

4. The electronic device of claim 1, wherein in response to the voltage of the input signal received by the first USB interface being less than the voltage threshold, the detecting unit determines that the connecting device is not the power adapter.

5. The electronic device of claim 4, wherein in response to determining that the connecting device is not the power adapter, the control unit controls the battery to supply power to the connecting device through the first USB interface.

6. The electronic device of claim 1, further comprising:
a feedback circuit electronically connected the control unit, the charging circuit, and the battery, to output a feedback signal to the control unit according to a charging voltage of the battery.

7. The electronic device of claim 1, further comprising:
a third switch comprising a first port, a second port, and a control port, wherein the first port is electronically connected to the first USB interface, the second port is electronically connected to the detecting unit, the control port is electronically connected to the control unit;

wherein in response to the detecting unit determining that the connecting device is the power adapter, the control unit controls the first port of the first switch to connect to the second port.

8. The electronic device of claim 1, further comprising:

a diode comprising an anode and a cathode, the anode of the diode is electronically connected to a node between the first USB interface and the comparing unit, the cathode of the diode is electronically connected to the charging circuit;

wherein in response to the detecting unit determining that the connecting device is not the power adapter, the diode prevents current of the battery flowing back.

9. The electronic device of claim 1, wherein the detecting unit comprises:

a first port and a second port, to determine whether or not the connecting device is the power adapter according to detecting signals of the first port and the second port;

wherein in response to both the detecting signal of the first port and the detecting signal of the second port being logic 1 signals, the detecting unit determines that the connecting device is the power adapter.

10. The electronic device of claim 1, wherein in response to the connecting device being the power adapter, the control unit outputs a logic 1 signal to the second switch, the control port of the second switch receives the logic 1 signal, the control port of the second switch receives a logic 1 signal from the second switch, the first port of the third switch connects to the second port, and the connecting device charges the battery through the first USB interface.

11. An electronic device comprising:
a first universal serial bus (USB) interface electrically connected to a connecting device, configured to receive an input signal from the connecting device, wherein the connecting device is a power adapter or a peripheral device including a general USB interface;
a battery;
a charging circuit electrically connected to the battery and the first USB interface;
a detecting unit electrically connected to the first USB interface, configured to detect and determine whether the connecting device is the power adapter;
a comparing unit electrically connected to the first USB interface, configured to output a level signal depending upon comparing the input signal received by the first USB interface with a voltage threshold; and
a control unit electrically connected to the detecting unit, the comparing unit, and the charging circuit, and configured to control the battery to be charged by the connecting device through the charging circuit or to supply power to the connecting device through the first USB interface, depending on the signal level output by the comparing unit;
a first switch comprising a first port, a second port, and a control port, wherein the first port is electronically connected to the first USB interface, the second port is electronically connected to the detecting unit, the control port is electronically connected to the control unit.

12. The electronic device of claim 11, wherein in response to the detecting unit determining that the connecting device is the power adapter, the control unit controls the first port of the first switch to connect to the second port.

* * * * *